US006791901B1

(12) United States Patent
Robertsson et al.

(10) Patent No.: US 6,791,901 B1
(45) Date of Patent: Sep. 14, 2004

(54) SEISMIC DETECTION APPARATUS AND RELATED METHOD

(75) Inventors: Johan Olof Anders Robertsson, Histon (GB); Andrew Curtis, Girton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/396,052

(22) Filed: Sep. 15, 1999

(30) Foreign Application Priority Data

Sep. 16, 1998 (GB) .............................................. 9820049
Mar. 29, 1999 (GB) .............................................. 9906995

(51) Int. Cl.$^7$ ................................................. G01V 1/00
(52) U.S. Cl. ........................... 367/58; 367/15; 367/21; 367/58; 702/14; 702/17; 181/110
(58) Field of Search .............................. 367/15, 21, 24, 367/56, 58; 702/14, 17; 181/110

(56) References Cited

U.S. PATENT DOCUMENTS

| 4,101,866 | A | * | 7/1978 | Ruehle ......................... 367/58 |
| 4,734,894 | A | * | 3/1988 | Cannelli et al. ............ 367/147 |
| 4,803,669 | A | | 2/1989 | Airhart |
| 4,979,150 | A | | 12/1990 | Barr |
| 5,231,252 | A | * | 7/1993 | Sansone ...................... 181/122 |
| 5,235,556 | A | * | 8/1993 | Monk et al. ................... 367/63 |
| 5,242,025 | A | * | 9/1993 | Neill et al. .................... 175/26 |
| 5,335,208 | A | * | 8/1994 | Sansone ....................... 367/49 |
| 5,343,001 | A | | 8/1994 | Cowles et al. |
| 5,545,858 | A | * | 8/1996 | Sansone ...................... 181/125 |
| 5,731,550 | A | | 3/1998 | Lester et al. |
| 5,971,095 | A | | 10/1999 | Ozbek |

FOREIGN PATENT DOCUMENTS

| EP | 0 347 019 A2 | 12/1989 |
| EP | 0 455 091 A2 | 11/1991 |
| GB | 2 288 236 A | 10/1995 |
| GB | 2 308 190 A | 6/1997 |
| GB | 2 333 364 | 7/1999 |
| GB | 2 337 591 A | 11/1999 |

OTHER PUBLICATIONS

Aki, K., and Richards, P. G. Elastic Waves from a Point Dislocation Source Quantitative Seismology—Theory and Methods, vol. 1 W. H. Freeman & Co., New York, 1980, p. 68–69.
Barr, F. J., and Sanders, J. I. Attenuation of water–column reverberations using pressure and velocity detectors in a water–bottom cable: Expanded abstracts from the 59$^{th}$ Ann. Internet. Mtg., Soc. Expl. Geophys., 1989, 653–656.
Holliger, K., and Robertsson, J. O. A. Effects of the shallow subsurface on upper crustal seismic reflection images Tectonophysics, 286, 1998, 161–169.

(List continued on next page.)

Primary Examiner—Nelson Moskowitz
(74) Attorney, Agent, or Firm—William L. Wang; William B. Batzer; John J. Ryberg

(57) ABSTRACT

Seismic detection apparatus comprising seismic detection means capable of detecting a plurality of seismic components over a defined tetrahedral volume is provided. The seismic detection means comprises four three-component geophones. Seismic data acquired by the geophones is processed to separate P-wave components from S-wave components. The geophones are spaced apart by distances smaller than the wavelength of the detected seismic components. The apparatus may be used on surface or in a marine environment or transition zone. A method of processing seismic data is also provided comprising acquiring seismic data relating to a wavefield over a selected volume of acquisition, and measuring the curl and divergence of the wavefield from the seismic data, to thereby identify seismic components within the seismic data. Additionally, an apparatus and method for hydrocarbon exploration is disclosed for using three or more seismic receivers placed in a plane and spaced closely to each other.

14 Claims, 8 Drawing Sheets

OTHER PUBLICATIONS

Osen; A. Amundsen, L., and Reitan, A. Towards optimal spatial filters for de–multiple and P/S splitting of OBC data: Expanded abstracts from the $68^{th}$ Ann. Internat. Mtg., Soc. Expl. Geophys., 1998, 2036–2039.

Robertsson, J. O. A., Holliger, K. and Green, A. G. Source–generated noise in shallow seismic data European J. Env. Eng. Geophys., 1, 1996, 107–124.

Råde, L., and Westergren, B. BETA β Mathematics Handbook, Studentlittaratur, Lund, 1988, p. 56, 68, 184 and 191.

Schalkwijk, K., Wapenaar, K., and Verschuur, E. Decomposition of multicomponent ocean–bottom data in two steps: Expanded abstracts from the $68^{th}$ Ann. Internat. Mtg., Soc. Expl. Geophys., 1998, 1425–1428.

Robertsson, J.O.A. A Numerical Free–Surface Condition for Elastic/Viscoelastic Finite–Difference Modeling in the Presence of Topography. Geophysics, vol. 61, (1996) pp. 1921–1934.

* cited by examiner

SEISMIC DETECTION APPARATUS AND RELATED METHOD

This invention relates to seismic detection apparatus and to a method of analyzing data acquired by such apparatus.

BACKGROUND OF THE INVENTION

In seismic detection, a seismic source signal propagates through different rock substrates or strata within the earth, so producing compression wave (P-waves) and shear wave (S-waves) energy which can be analyzed to determine the direction and extent of geological features in strata.

Generally a seismic source signal is produced, either on land, sea, or in a borehole, the source signal usually being produced as either acoustic or elastic energy. Some of the energy radiates downward through geological layers within the earth and is reflected in varying proportions at different layer boundaries and this reflected energy can be detected at the surface. Some of the energy within the seismic source signal propagates directly along the ground producing a wave signal known as ground-roll. To detect the acoustic reflections which are in the form of P-waves and S-waves, a linear or areal array of geophones is often used to reinforce the reflected energy and to attenuate the energy associated with ground-roll so that a good signal to noise ratio can be achieved for the reflected wave components of interest.

It is desirable to be able to separate the P-wave and S-wave components of an elastic wave field as the separated components can be used more effectively to identify different characteristics than when combined. It is an aim of the present invention to provide improved separation of seismic signals into P-wave and S-waves.

Methods have been described which use three or more sensors in close proximity (e.g. less than 1 meter) for determining certain ground characteristics very close to the sensors. For example, in published European Patent Application 0 455 091 A2 (Application No. 91106459.0), a method is described which uses relatively closely spaced "oscillation sensors" to determine the "laminar structure and other characteristics of [the] ground." However, this method only provides information about characteristics of the ground within a distance from the sensor array of the order of the maximum wavelength of the surface waves (hereinafter referred to as the "near-site ground structure"). Moreover, the method relies on sensing "microseisms" which is believed to refer to naturally occurring seismic activity. Thus, the published application does not disclose a method using seismic energy from a man-made seismic source, nor does it teach a method of sensing the components used to process reflected waves. Rather the method is only concerned with ground-roll type waves and does not teach or suggest a method suitable for hydrocarbon exploration using seismic energy reflected from man-made seismic sources.

SUMMARY OF THE INVENTION

According to one aspect of the present invention, there is provided seismic detection apparatus comprising seismic detection means capable of detecting a plurality of seismic components over a selected volume.

Preferably the seismic detection means comprises a plurality of receivers spaced apart to enclose the selected volume. The receivers may include hydrophones, geophones, accelerometers or a combination of these, and preferably are adapted to detect seismic signals along three mutually orthogonal axes. Thus the receivers may be provided by three-component geophones.

Preferably the selected volume is formed by at least three receivers spaced within a plane and at least one receiver placed external to the plane, thereby to enclose the selected volume over which measurement of seismic signals occurs.

In accordance with the invention, the receivers can be spaced to form a tetrahedron with three receivers spaced to define a triangle within the plane and a fourth receiver placed external the plane but in line with the centroid of the triangle. Other configurations of spaced apart receivers may be used depending on the characteristics of the wavefield being measured, for example receivers may be spaced to form an octahedral volume, a cubic volume, or a spherical volume. Certain shaped volumes may be more appropriate for different uses, for example receivers spaced to form an octahedral volume may be more appropriate for use with permanent downhole sensors.

The seismic detection apparatus in accordance with the present invention is suitable for use on the ground surface or ocean bottom. When used on the ground surface, the enclosed volume can be achieved by placing one receiver further below the surface of the other receivers, for example by burying it beneath the surface. With marine and ocean bottom surveys, the volume may be defined by tethering the receivers at different water depths, for example by placing three receivers spaced apart at the same depth, and a fourth receiver at a different depth. The seismic detection apparatus according to the present invention is also of use in seismic detection in transition zones such as swamps and marshes, where again tethering of the receivers at different depths will define the enclosed volume.

The apparatus may also have all the receivers incorporated into one body for attaching to a wireline and using downhole, or for using permanently downhole. Such a permanent sensor is of particular advantage where monitoring of a reservoir or other geological feature over time is required. This may be appropriate when monitoring fluid flow occurring within a reservoir as permanent sensors can be used to detect natural seismicity resulting from fluid opening and closing micro-fissures within the substrates and producing micro-earthquakes. Whilst these micro-earthquakes produce very weak broadband signals, by use of permanent sensors, this activity can be detected and production adapted by remedial action such as acid to remove carbonate deposits, or fracturing rock with high pressure steam or water, so as to improve production efficiency.

Preferably the apparatus further comprises processing means which analyses detected seismic components from individual receivers to separate P-wave components from S-wave components. The processing means may be provided at substantially the same location as the receivers to allow for on-site processing, or remote from the receivers to allow off-site processing.

In surveys of the vertical component of seismic data, the receivers may be adapted to detect components along one axis and orientation of the receivers selected so as to permit processing of one-component data to identify P-wave components. Therefore the receivers may be provided by one-component geophones.

Preferably the spacing of the receivers is selected to be smaller than the wavelength of the detected seismic components. A preferred spacing is less than 1 m, more preferably between 0.05 m and 0.50 m, although larger spacings of up to a third of the shortest detected wavelength are possible, and thus the range may be between 1.5 and 15 m.

In use, the apparatus may be operated to detect seismic signals over a time period of the order of five seconds where P-wave components are of principal interest, with any marginal S-wave component detected at that time being used to produce improvements in the signal to noise ratio.

Where a detection time of the order 10 to 15 seconds is used, both P-wave and S-wave components will be detected within the seismic signals and may be separated for multi-component inversion yielding images of reservoirs and other geological formations, and full reservoir characterization.

In accordance with another aspect of the invention, there is provided a method of processing seismic data comprising acquiring seismic data relating to a wavefield over a selected volume of acquisition, and measuring the curl and divergence of the wavefield from the seismic data, to thereby identify seismic components within the seismic data.

As P-waves are curl free and S-waves divergence free, this allows the separate identification of P-wave and S-wave components. Up-going and down-going wavefield components in boreholes may also be identified from the seismic data. Attenuation of unwanted seismic components from data acquired downhole is also enabled, and noise sources such as ground roll, airwave and inter-sensor perturbations can be removed from the data by signal processing.

The method preferably further comprises averaging the curl and divergence over the selected volume of acquisition, and where appropriate acquiring seismic data over a selected period of time.

Additionally the method may further comprise defining the selected volume of acquisition to be small compared to the wavelength of seismic waves to be detected.

As described above, in a seismic acquisition at a free surface, the constraints imposed by the free surface enable the reduction of the acquisition volume to a acquisition surface where all receivers are located in a plane.

In another aspect of the invention, the representation theorem based filters used for removing multiples from Ocean Bottom Cable data as described in the Published UK Patent Application GB 2 333 364 A (Published 21 Jul. 1999) is modified to provide a method of separating the seismic data acquired with the planar receiver configuration above into up- and downgoing wavefield.

In a variant that is particularly suitable for hydrocarbon exploration seismic acquisitions at a free surface or fluid/solid boundary, the volume formed by the receivers can be reduced to a plane. Hence, three 3-component receivers can be used in combination with the free surface (or fluid/solid) condition constraints to advantageously determine approximations to the spatial and temporal derivatives local to the receivers (hereinafter the "full wavefield"). The receivers should be adapted to measure the seismic energy from a seismic source that has been reflected from one or more subterranean earth structures outside the near-site ground structure.

According to a further aspect of the invention, each of the receivers are one-component geophones and a fourth seismic receiver is located less than about 1 meter from the other three seismic receivers.

A method for hydrocarbon exploration is also provided that includes imparting seismic energy into the earth that travels through the earth and reflects off of one or more subterranean earth structures outside the near-site ground structure. At least three seismic receivers are positioned substantially in a plane at or near the earth surface, and the seismic receivers are spaced less than about 1 meter from each other to form a receiver cluster. The received seismic energy is stored and analyzed to determine characteristics of one or more hydrocarbon reservoirs.

Preferably, the curl and divergence of the wavefield is determined from the seismic data, thereby identifying seismic components within the seismic data.

Preferably, the P-wave and S-wave components are separately identified, the up-going and down-going wavefield components are identified from the seismic data, and unwanted seismic components from seismic data is attenuated.

Preferably, the curl and divergence is averaged over the selected plane or volume of acquisition, and the selected plane or volume of acquisition is defined to be small compared to the wavelength of seismic waves to be detected.

These and other features of the invention, preferred embodiments and variants thereof, possible applications and advantages will become appreciated and understood by those skilled in the art from the detailed description and drawings following hereinafter.

MODE(S) FOR CARRYING OUT THE INVENTION

Figure 1:
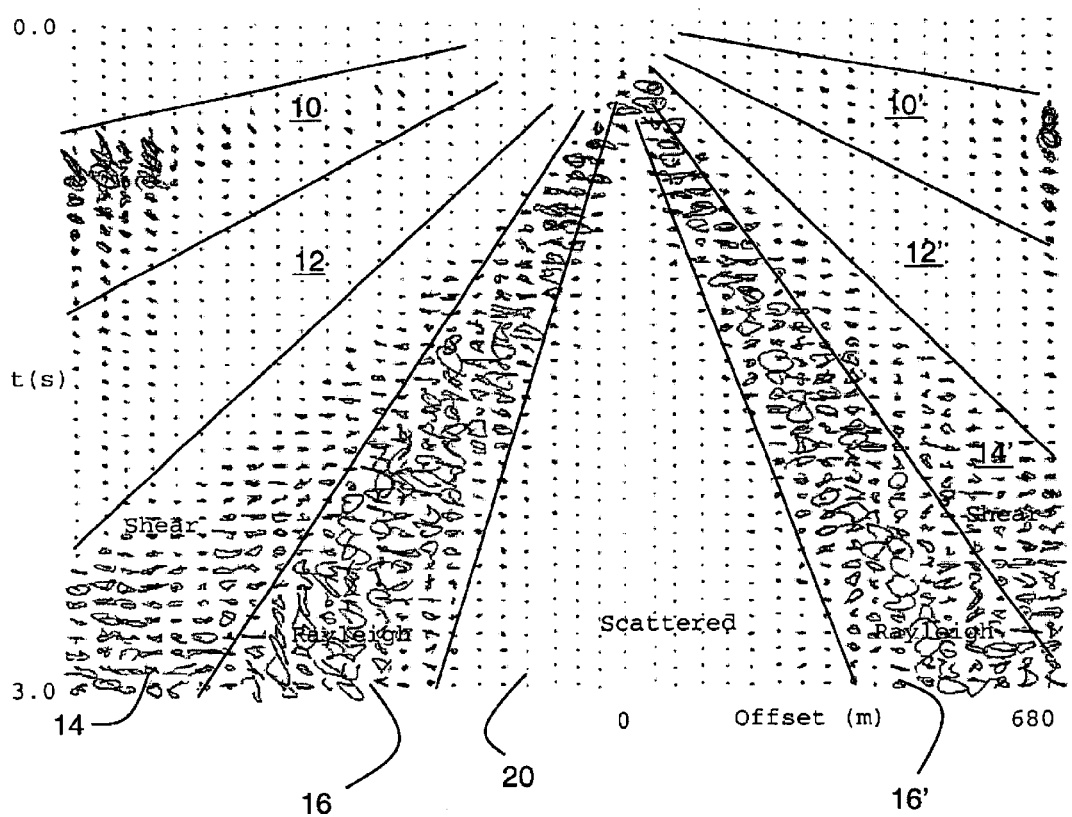
FIG. 1 shows an example of the distribution of seismic data over a specified period of time.

In FIG. 1, a typical hodogram of a three component marine shot gather survey is shown, where the x axis is the offset in meters and the y axis is time in seconds from the generation of a source signal at t=0. A hodogram displays the different seismic components detected over a specified time-window. The first arrivals around t=1 s predominantly comprise P-waves 10, 10'. Near-surface scattering and channeling in slower near-surface layers are revealed in the P-wave arrivals contained in the hodogram through some degree of elliptical motion. Following the P-wave arrivals is a relatively quiet section 12, 12' (where deeper reflections can be observed) until the S-wave arrivals 14, 14' are observed near t=3 s. The S-waves also scatter and become channeled in the near-surface which causes ellipticity in the hodogram.

Following the S-wave arrivals are elliptically polarized Rayleigh waves 16, 16' (ground-roll). The innermost "cone" 20 of the section consists of strongly scattered energy that typically masks deeper reflections.

Noise in seismic data to a large degree comprises source-generated ground-roll and S-waves. Separating P-wave data from S-wave data is useful to reduce noise attenuation. Also P-wave data may be of primary interest with the complete removal of S-waves being preferred, for example in shallow seismic imaging for engineering or environmental purposes.

Measuring the P-wave and S-wave components of an elastic wavefield separately has several advantages. First, separation of P-waves and S-waves enables better and more accurate analysis of each separated component thus improving moveout analysis and Amplitude Versus Offset (AVO) analysis. Secondly heterogeneity in the near-surface (as well as deeper down in the crust) and rough surface topography, scatter S-waves to a greater extent than P-waves, with scattered S-waves significantly contributing to noise in seismic reflection data.

Figure 2:
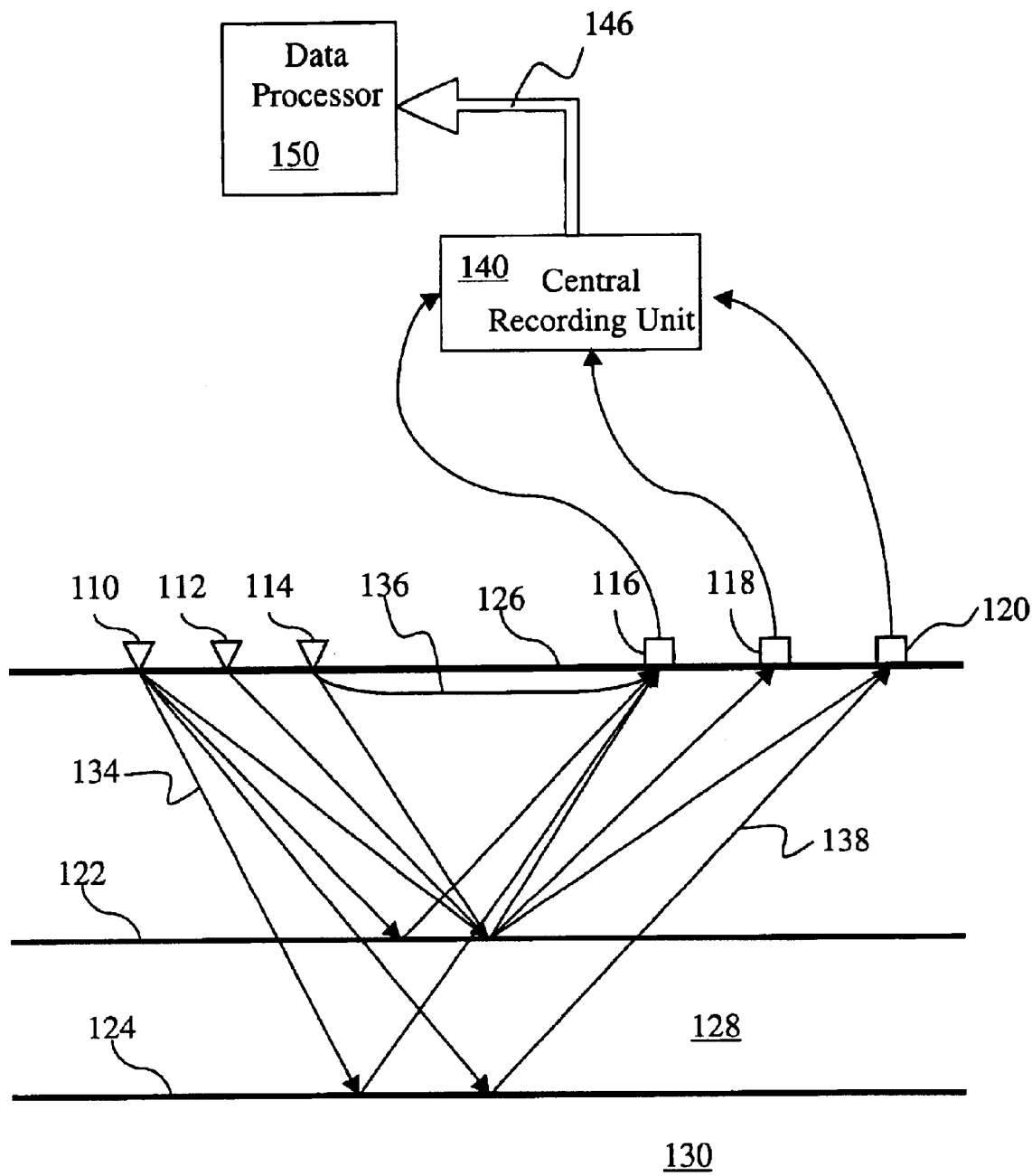
FIG. 2 shows an example of a seismic data acquisition and system according to the present invention.

FIG. 2 is a schematic illustration of a seismic data acquisition and processing system. Seismic sources 110, 112, and 114 are depicted which impart seismic energy into the earth at its surface 126 at predetermined times upon command of a controller (not shown). The seismic sources may comprise impulsive sources (such as explosives, or in the marine environment, airguns) or vibratory sources. While three sources are depicted for simplicity, other numbers of sources, including a single source, could be used. The seismic data acquisition could be carried out on land, marine, or transition-zone environments. In the case of marine acquisition, 126 would depict the ocean bottom, and the sources 110, 112 and 114 would typically be submerged at a predetermined depth near the water surface (not shown). In this case receivers 116, 118 and 120 can be in an ocean bottom cable. In the case of land acquisition, surface 126 is the ground, and truck mounted vibrators can be used as sources 110, 112 and 114. The seismic energy imparted by the sources travels through the earth in the form of both p and s waves; this is schematically depicted in FIG. 2 as, for example, arrow 134. The energy reflects off of certain subterranean surfaces, here depicted as surface 122 and surface 124, and eventually reach and are detected by receivers 116, 118, and 120 as depicted, for example, by arrow 138. According to the preferred embodiment, receivers 116, 118 and 120 will be geophones, but other suitable receivers such as optical sensors could be used. Note that receivers 116, 118 and 120 in FIG. 2 correspond to the receivers and geophones depicted in FIGS. 3, 4, 6, and 7. Although only three receivers are shown in FIG. 2, there could be more receivers used in a particular embodiment. For example, in the embodiments shown in FIGS. 3, 4 and 7, at least four receivers are used.

Referring again to FIG. 2, the apparatus shown is being used for seismic exploration of hydrocarbon reservoirs. Cap rock 128 is relatively impermeable to the hydrocarbon substance. The hydrocarbon substance is thereby trapped in hydrocarbon reservoir 130. Hydrocarbon reservoir 130 is typically made up of a reservoir rock (for example sandstone in a sand channel) and the interface between it and the cap rock 128 reflects the seismic energy back to the receivers as depicted by arrow 138. Also shown in FIG. 2 is ground roll (e.g. Rayleigh waves) which is schematically depicted as arrow 136. Ground roll travels in the near-surface region and does not penetrate to depths necessary for locating and characterizing hydrocarbon reservoirs such as reservoir 130.

Receivers 116, 118, and 120 convert the seismic energy into electrical signals and transmit these signals to a central recording unit 140. In the case of land acquisition this central recording unit 140 is typically located at the local field site, and in marine acquisition it is typically located on the vessel used to tow the sources and receivers (not shown). Once the central processing unit 140 performs correlation and other desired processing, it typically stores the data in the form of time-domain traces on a magnetic tape. The data, in the form of magnetic tape is later sent for processing and analysis to a seismic data processing center, typically located in some other geographical location. The data transfer from the central recording unit 170 in FIG. 2 is depicted as arrow 176 to a data processor 180.

Figure 3:
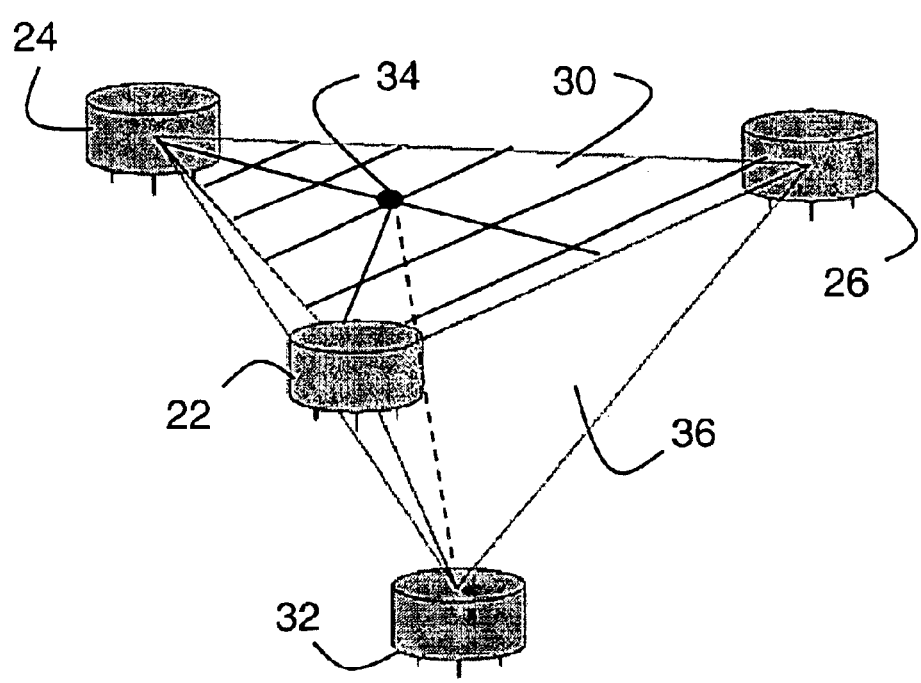
FIG. 3 shows one embodiment of seismic detection apparatus according to the present invention.

FIG. 3 shows one embodiment of a seismic detection apparatus according to the present invention, with four three-component detectors, such as geophones or hydrophones, being placed to form an enclosed tetrahedral volume. Geophones are velocity motion sensors, with hydrophones being pressure sensors. Geophones 22, 24, 26 are arranged in a horizontal plane 30 with each geophone being spaced the same distance from the other two geophones, so as to form an equilateral triangle. The fourth geophone 32 is placed vertically below the centroid 34 of the equilateral triangle formed by geophones 22, 24, 26. Placing of geophone 32 external to the horizontal plane 30 is achieved by positioning the horizontal plane 30 on or close to the Earth's surface with the fourth geophone 32 dug to a position well below surface. Within a marine, ocean bottom or swamp environment, the arrangement of receivers is achieved by tethering three hydrophones and/or geophones at one depth and one hydrophone and/or geophone at a different depth.

An ideal tetrahedral volume is not essential, and thus for example two geophones placed external to horizontal plane 30 can be used.

The geophones 22, 24, 26 are positioned one meter apart, although spacing will vary depending on the surrounding rock substrate and how fast waves travel within the substrate. The spacing of the geophones to form an enclosed volume 36 is chosen so that the wavefield is detected on a scale which is smaller than the wavelengths of interest. For wave frequencies of between 50 to 100 Hz with velocity ranging from 300–2000 m/s, the wavelength tends to be in the range 5 to 50 m. To record the wavefield over such a range, the spacing of the geophones is generally a third of the wavelength and generally in the range 1.0 m to 15 m, although may be as small as 0.05 m. The tetrahedron arrangement shown in FIG. 3 uses the minimum number of geophones required to define an enclosed volume, although other configurations with more geophones are possible, such as those forming an octahedron, cube or sphere.

The use of four three-component geophones distributed as shown in FIG. 3 allows the separation of the wavefield into P-waves and S-waves. After the seismic data has been recorded either where acquisition of data is occurring or remote from the geophones, differences in geophone coupling can be removed by normalizing separately the responses of each component at the corners of the tetrahedron. If required, more accurate compensation for coupling differences can be obtained by using information from adjacent tetrahedral arrays of geophones, while preserving the offset varying character of the seismic data. The geophone coupling may also be frequency dependent varying from geophone to geophone.

The three-component geophones 22, 24, 26, 32 detect components of the seismic signal at three orthogonal axes. By measuring the curl of a displacement field u (x, t) within the enclosed volume 36 and the divergence of the displacement field within the volume 36, it is possible to separate out the P-wave and S-wave components as P-waves have zero curl and S-waves have zero divergence.

Figure 4:
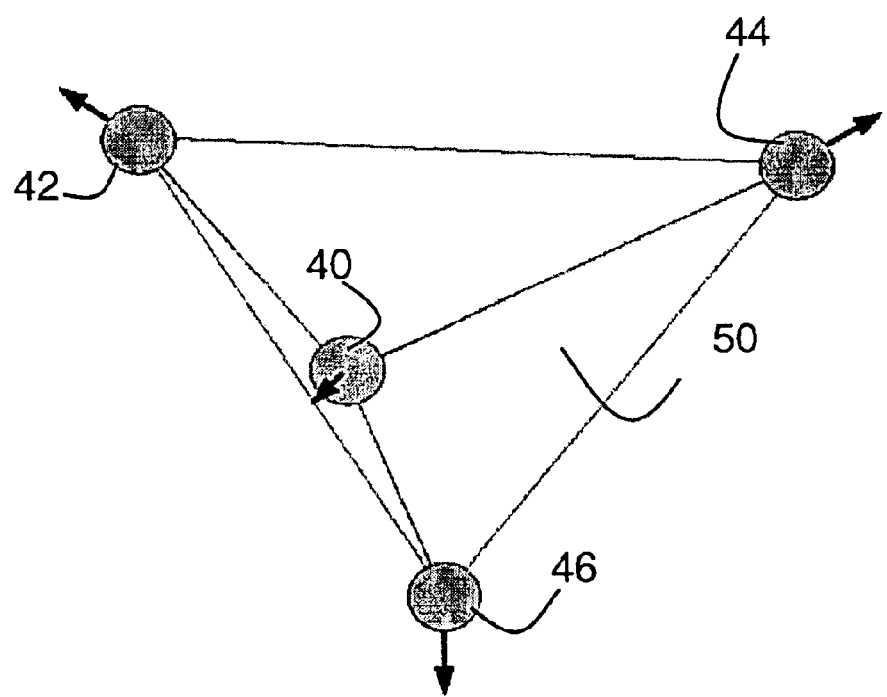
FIG. 4 shows a second embodiment of seismic detection apparatus according to the present invention.

With the array of geophones shown in FIG. 4, the four geophones 40, 42, 44, 46 are one-component geophones. The array encloses a tetrahedral volume 50 once more, but the axis along which each one-component geophone measures is calculated and precisely implemented when positioning the apparatus to ensure that the divergence can be deduced from the single components measured. Measuring with single component geophones provides less information about the seismic signals. However at present 90% of seismic surveys only monitor the vertical component, and the apparatus of FIG. 4 when used with a listening time of five seconds allows a substantial improvement in the signal to noise ratio if looking principally for P-wave components.

Once data are acquired using the geophone array enclosing a volume, separation of the wave-field into P-waves and S-waves or improvement of the signal to noise ratio for P-wave components, can be undertaken by use of the method described below.

The elastic wave equation for a displacement field u(x,t) in an isotropic medium with Lamé parameters $\lambda$ and $\mu$ and density $\rho$ can be written as:

$$\rho \ddot{u} = f + (\lambda + 2\mu)\nabla(\nabla \cdot u) + \mu \nabla \times (\nabla \times u) \qquad [1]$$

Here f denotes a distribution of body forces. Lamé's thereon (Aki and Richards, 1980) states that there exist potentials $\Phi$ and $\Psi$ of u with the following properties:

$$u = \nabla\Phi + \nabla \times \Psi, \qquad [2]$$

$$\nabla \cdot \Psi = 0, \qquad [3]$$

$$\Phi = \frac{\Phi}{\rho} + \alpha^2 \nabla^2 \Phi, \qquad [4]$$

$$\Psi = \frac{\Psi}{\rho} + \beta^2 \nabla^2 \Psi, \qquad [5]$$

where $\alpha$ and $\beta$ are the P- and S-velocities. An elastic wavefield u can thus be decomposed into its P- and S-wave components, $\nabla\Phi$ and $\nabla \times \Psi$, respectively. Equations [2] and [3] yield $$\nabla \cdot u = \nabla^2 \Phi, \qquad [6]$$

$$\nabla \times u = \nabla \times \nabla \times \Psi \qquad [7]$$

(Råde, L., and Westergren, N., 1988, BETA $\beta$ Mathematics Handbook: Student litteratur, Lund.). By measuring the curl and the divergence of an elastic wavefield we can thus measure the P- and S-wave components separately.

The technique for P- and S-wave separation is based on recording the elastic wavefield around a small volume as compared to the wavelength. The volume may be of arbitrary shape, but the equations for wavefield separation are simplified if the volume has a known deterministic shape such as that of a tetrahedron, cube, octahedron or a sphere. A co-ordinate system that is appropriate for the geometry employed simplifies the equations further. The discussion of the method below uses a tetrahedron and the formulae are derived in Cartesian co-ordinates.

Figure 5:
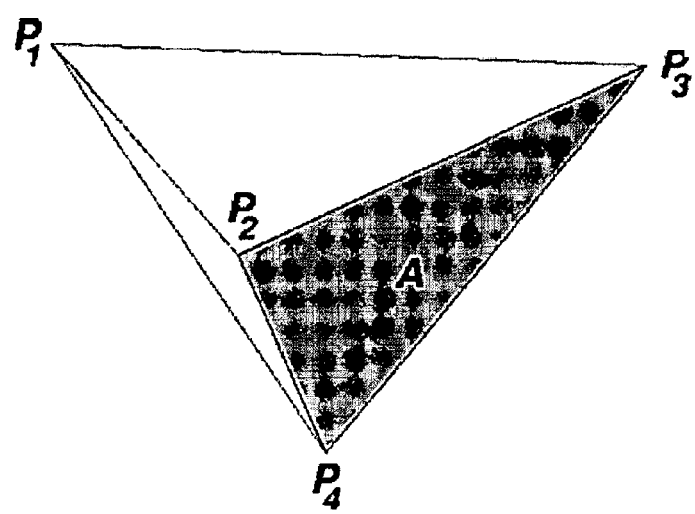
FIG. 5 shows a tetrahedron used in explanation of a processing method according to the present invention.

FIG. 5 shows a tetrahedron with corner points $p_1$, $p_2$, $p_3$, and $p_4$. We denote the Cartesian co-ordinates of point $p_i$ by $(x_i, y_i, z_i)$. Let $\overline{P_jP_i}$ denote the vector that starts at $p_i$ and ends at $p_j$. The volume of the tetrahedron in FIG. 5, $V_{tetra}$, can be calculated from the absolute value of the determinant of the matrix M with the vectors $\overline{P_2P_1}$, $\overline{P_3P_1}$, and $\overline{P_4P_1}$ as rows:

$$V_{tetra} = \frac{1}{6}|\det M|. \qquad [8]$$

Gauss' theorem states $$\iiint_V (\nabla \cdot u) dV = \iint_S u \cdot dS \qquad [9]$$

or alternatively, $$\iiint_V (\nabla \times u) dV = \iint_S u \times dS. \qquad [10]$$

If the dimensions of the tetrahedron configuration in FIG. 5 are small compared to the wavelength of u, the mean values of the curl and divergence in equations [9] and [10] can be calculated from:

$$\nabla \cdot u \approx \frac{1}{V_{tetra}} \iiint_V (\nabla \cdot u) dV \qquad [11]$$

and $$\nabla \times u \approx \frac{1}{V_{tetra}} \iiint_V (\nabla \times u) dV. \qquad [12]$$

Moreover, the surface integrals on the right hand side of equations [9] and [10] reduce to four surface integrals respectively, over plane triangular surfaces.

Since the normal to the surface of the tetrahedron does not vary over each of the triangular sub-surfaces, equation [9] becomes $$\iiint_V (\nabla \cdot u) dV = \iint_{S_{123}} u dS \cdot n_{123} + \qquad [13]$$
$$\iint_{S_{243}} u dS \cdot n_{243} +$$
$$\iint_{S_{142}} u dS \cdot n_{142} +$$
$$\iint_{S_{134}} u dS \cdot n_{134},$$

where $n_{ijk}$ is the outward unit normal to the triangular subsurface $S_{ijk}$ with corner points $p_i$, $p_j$ and $p_k$ (see FIG. 5).

Where the side of the tetrahedron is small compared to the wavelength of the elastic wavefield, the value of u at any point on one of the triangular surfaces of the tetrahedron can be calculated by linear interpolation of the wavefield between the three corner points of the triangle. The surface integral over $S_{ijk}$ (using linear interpolation between $p_i$, $p_j$ and $p_k$) then reduces to $$\iint_{S_{ijk}} u dS = \frac{A}{3}(x_i + x_j + x_k, y_i + y_j + y_k, z_i + z_j + z_k), \qquad [14]$$

where A is the area of $S_{ijk}$. Since $An_{ijk} = \overline{P_jP_i} \times \overline{P_kP_i}/2$ we have $$\iiint_V (\nabla \cdot u) dV = \qquad [15]$$
$$\frac{1}{6}[(x_1 + x_2 + x_3, y_1 + y_2 + y_3, z_1 + z_2 + z_3)(\overline{P_2P_1} \times \overline{P_3P_1}) +$$
$$(x_2 + x_4 + x_3, y_2 + y_4 + y_3, z_2 + z_4 + z_3)(\overline{P_4P_2} \times \overline{P_3P_2}) +$$
$$(x_1 + x_4 + x_2, y_1 + y_4 + y_2, z_1 + z_4 + z_2)(\overline{P_4P_1} \times \overline{P_2P_1}) +$$
$$(x_1 + x_3 + x_4, y_1 + y_3 + y_4, z_1 + z_3 + z_4)(\overline{P_3P_1} \times \overline{P_4P_1})]$$

Equivalently, the curl of u in V can be calculated as $$\iiint_V (\nabla \times u) dV = \quad [16]$$
$$\frac{1}{6}[(x_1 + x_2 + x_3, y_1 + y_2 + y_3, z_1 + z_2 + z_3)(\overline{P_2P_1} \times \overline{P_3P_1}) +$$
$$(x_2 + x_4 + x_3, y_2 + y_4 + y_3, z_2 + z_4 + z_3)(\overline{P_4P_2} \times \overline{P_3P_2}) +$$
$$(x_1 + x_4 + x_2, y_1 + y_4 + y_2, z_1 + z_4 + z_2)(\overline{P_4P_1} \times \overline{P_2P_1}) +$$
$$(x_1 + x_3 + x_4, y_1 + y_3 + y_4, z_1 + z_3 + z_4)(\overline{P_3P_1} \times \overline{P_4P_1})]$$

Finally, the average values of the divergence and curl of u within V are obtained from equations [11] and [12].

In this way, the divergence and curl of a wavefield can be calculated from a set of closely spaced measurements distributed in all spatial directions. A minimum of four measurement points is needed. The volume that is bounded by planes connecting these points is generally a tetrahedron and where the dimensions of the tetrahedron are small with respect to the wavelength of the wavefield, an assumption that the wavefield varies linearly along each side of the enclosed volume is possible. The average divergence and average curl can then be efficiently calculated using Gauss' theorem.

For instance the average divergence inside the tetrahedron is calculated from the volume integral of the divergence of the wavefield over the tetrahedron, divided by its volume. The volume integral can in turn be converted to four surface integrals over each side of the tetrahedron by using Gauss' theorem. If the wavefield varies linearly over each side, these surface integrals are simply the volume of a prism where the base of the prism is the surface area and the heights of the three corners are the magnitude of the wavefield in the respective corners projected onto the normal of the surface.

The average curl of the wavefield is evaluated similarly. The same procedure can be used to calculate average curl and divergence over more general volumes.

Uncertainties in the actual geometry can be eliminated by allowing the exact locations of $p_1$, $p_2$, $p_3$, and $p_4$ to vary subject to either minimizing equation [16] over a window(s) with an identified P-event and/or minimizing equation [15] over S-events. This technique may also serve as an alternative means for adjusting for the differences in geophone coupling over the tetrahedron.

For anisotropic media the decomposition of u into P- and S-wave components as described by equations [2], [3], [4] and [5] is strictly not valid since the (quasi) P- and S-waves in anisotropic media both have compressional and shear components. However, this is of secondary importance and the theory above will be approximately valid for most practical cases.

In heterogeneous media, the heterogeneities act as secondary sources and scatter the wavefield. The separation of a wavefield into P-waves and S-waves is not strictly valid in the vicinity of a source. However the P/S separation technique described herein is generally applicable for common heterogeneous and anisotropic Earth materials, as well as for isotropic materials as discussed above.

With the apparatus and associated method, P-wave and S-wave components in seismic data can be separated.

In addition attenuation of near-surface scattering is possible as much noise is of S-wave character and where the primary interest is to record P-wave data, S-waves can be removed by employing the configuration of four one-component geophones as shown in FIG. 4.

The present invention is particularly well-suited for seismic techniques applied to hydrocarbon exploration. However, the present invention also finds application in environmental, engineering and groundwater exploration and imaging. For such applications, it is typically of interest to image or detect very shallow structures, as shallow as 1–100 m. Near-surface generated noise is particularly severe in these applications and a configuration of receivers such as in FIG. 4 is particularly advantageous for shallow seismics.

The invention also allows for the attenuation of ground-roll. Since ground-roll can be elliptically polarized, it will appear both in the separated P- and S-wave sections, but with lower amplitude in the separated P-wave sections.

P- and S-wave separation is of particular use for marine seismic data recorded at the seafloor, since the near-surface at the seafloor is generally is of a more homogeneous character than at in land. The technique is of use in removing Scholte waves that typically contaminate ocean data. Moreover, measurements of the wavefield over a volume also allows for the separation of the wavefield into up- and down-going waves.

Figure 6:
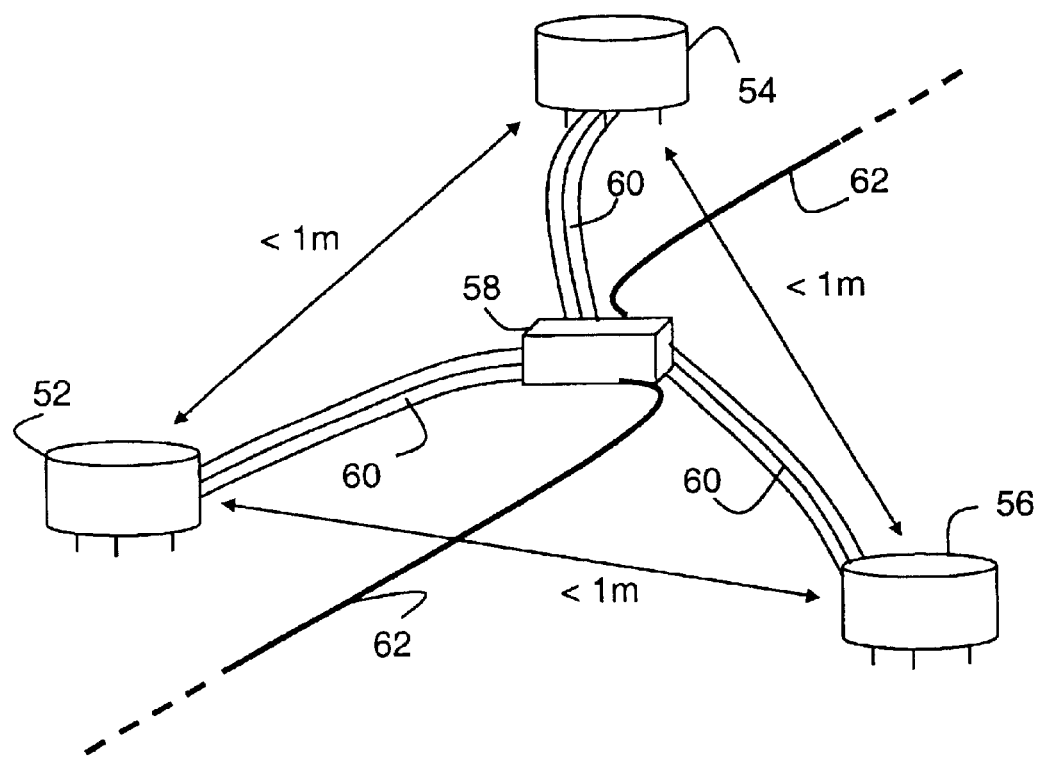
FIG. 6 shows a planar configuration of receivers according to the present invention.

FIG. 6 shows a receiver arrangement particularly useful for land acquisition. It comprises three 3C (component) geophones 52, 54, 56 arranged in a plane on the surface of the survey terrain. Each component of each geophone is measured independently. Thus, the three geophones are connected to the recording or processing unit 58 via a total of nine channels 60. Cable 62 provides a signal transmission between the groups of geophones.

The preferred spacing of the geophones in this embodiment is chosen in the same manner as described above, i.e. so that the wavefield is detected on a scale which is smaller than the wavelengths of interest. For wave frequencies of between 50 to 100 Hz with velocity ranging from 300–2000 m/s, the wavelength tends to be in the range 5 to 50 m. To record the wavefield over such a range, the spacing of the geophones is generally a third of the wavelength and generally in the range 1.0 m to 15 m, although may be as small as 0.05 m.

In this embodiment, the calculations according to the above equations are modified by introducing the free surface boundary condition. This condition constrains the possible solutions for the wavefield such that it is not necessary to employ a (fourth) out-of-plane receiver to sample additional components of the wavefield.

Furthermore the free surface condition is introduced into a formalism known as the elastodynamic representation theorem. This theorem is used for example in the Published UK Patent Application GB 2 333 364 A (Published 21 Jul. 1999) to derive filters for separating up- and downgoing wavefield in the case of ocean bottom acquisition.

Using the representation theorem and the boundary conditions of a solid-air interface, the following equations for up/down going separation of particle velocities v recorded by the planar receiver arrangement can be obtained:

$$v_v^U(x) = \frac{1}{2}(v_v(x) - F_{v_3}^{v_v}(x) * v_3(x)), \quad [17]$$

$$v_3^U(x) = \frac{1}{2}(v_3(x) - F_{v_v}^{v_3}(x) * v_v(x)). \quad [18]$$

The subscripts n and m denote indices for the horizontal coordinate axes x and y (for the 2-D case they reduce to x). The filters in equations [17] and [18] are $$F_{v_3}^{v_v} = -2\partial_v(1 + 2k_\beta^{-2}\partial_\mu^2)g(k_\alpha) + 2k_\beta^{-2}\partial_3^2 g(k_\beta) \text{ and} \quad [19]$$

$$F_{v_v}^{v_3} = 2k_\beta^{-2}\partial_v(-2\partial_3^2 g(k_\alpha) + (k_\beta^2 + 2\partial_3^2)g(k_\beta)). \quad [20]$$

In particular for the two dimensional (2D) case (in the frequency-wavenumber domain), using expressions for Green's functions in a homogeneous medium, equations [19] and [20] become:

$$F_{v_z}^{v_x} = \frac{k_x}{2}\left(\left(1-2\frac{k_x^2}{k_\beta^2}\right)\frac{1}{k_z^{(\alpha)}} - \frac{2}{k_\beta^2}k_z^{(\alpha)}\right) \text{ and} \quad [21]$$

$$F_{v_x}^{v_z} = -\frac{k_x}{2k_\beta^2}\left(2k_z^{(\alpha)} - 2k_z^{(\beta)} + \frac{k_x^2}{k_z^{(\beta)}}\right), \quad [22]$$

where $k_z^{(\alpha)} = \sqrt{k_\alpha^2 - k_x^2}$ is the vertical wavenumber for P-waves and $k_z^{(\beta)} = \sqrt{k_\beta^2 - k_x^2}$ is the vertical wavenumber for S-waves.

Filters for combinations of partial derivatives of velocities (e.g. divergence and curl) can be obtained using equations [17] and [18]. Note that for an isotropic elastic medium vertical derivatives of particle velocities recorded at the free surface can be converted to horizontal derivatives (i.e. the 'free surface condition', see J. O. A. Robertsson, "A numerical free-surface condition for elastic/viscoelastic finite-difference modeling in the presence of topography", Geophysics, 1996, Vol. 61, pp. 1921–1934, incorporated herein by reference). A similar transformation of vertical to horizontal derivatives can be performed at the ocean sea bottom using the fluid/solid boundary condition. A related approach has been disclosed in the Published UK Patent Application GB 2 333 364 A (Published 21 Jul. 1999), incorporated herein by reference.

Figure 7:
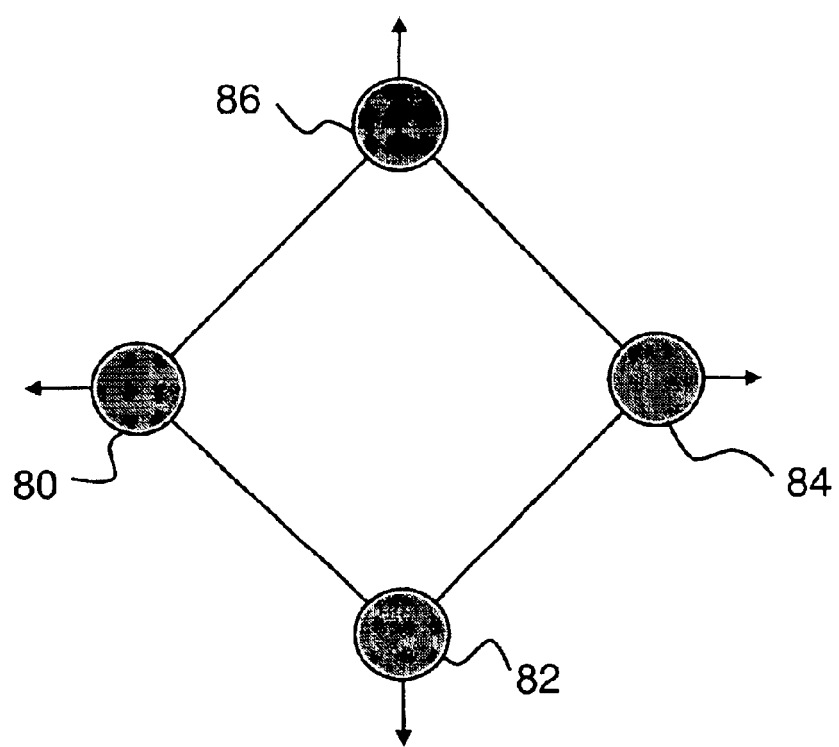
FIG. 7 shows a top view of a configuration of four 1C geophones in a plane that can be used to measure the divergence on the Earth's free surface according to the present invention.
Figure 8:
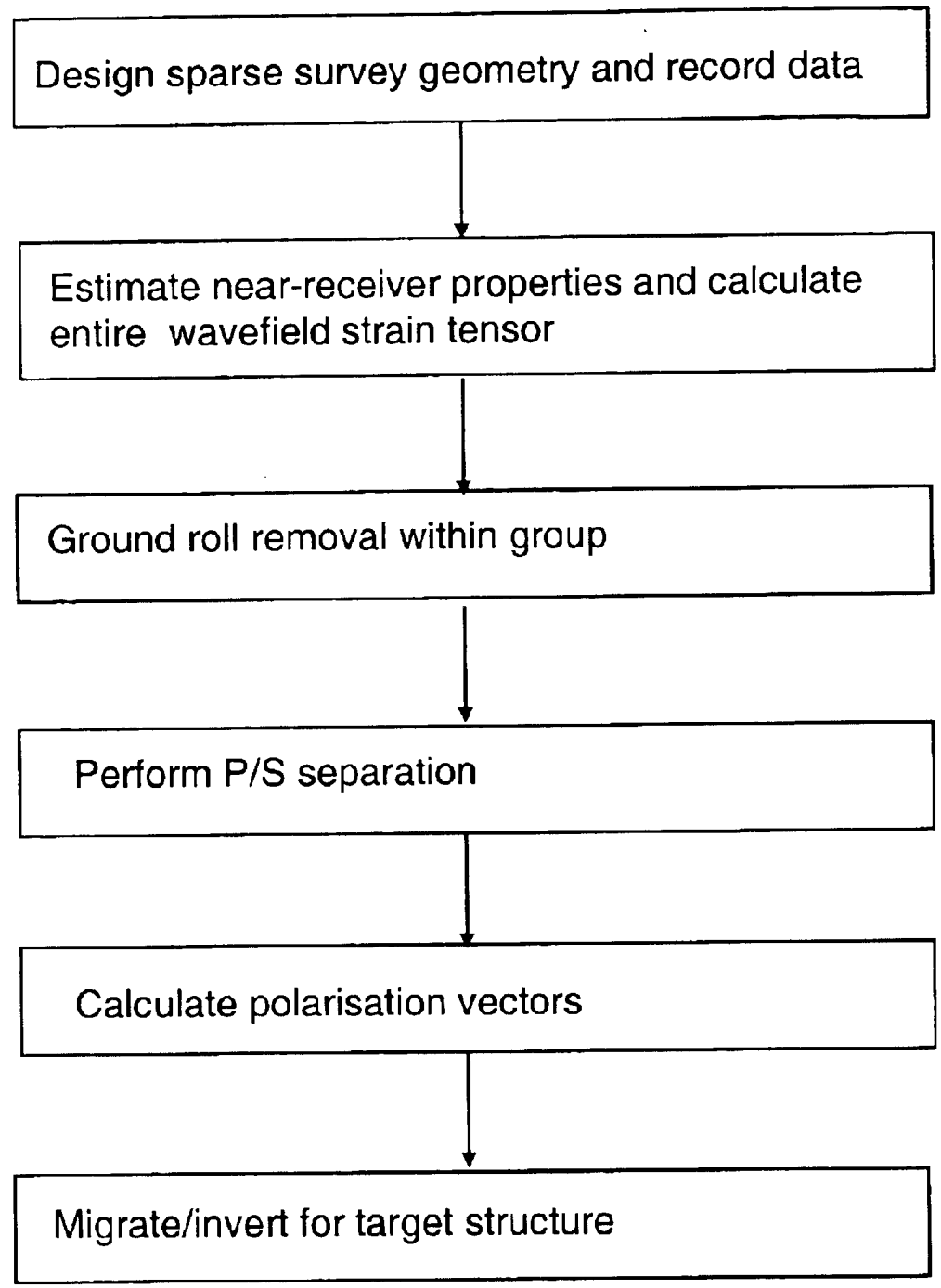
FIG. 8 summarizes a processing method based on a planar receiver arrangement according to the present invention.

According to another embodiment, shown in FIG. 7, one-component sensors can also be used in a closely spaced surface-plane arrangement. FIG. 7 is a top view of a configuration of four 1C geophones, 80, 82, 84 and 86 in a plane that can be used to measure the divergence at the Earth's free surface. As mentioned above vertical derivatives can be converted to horizontal derivatives using the free surface condition (or in a marine environment, fluid/solid boundary condition). Therefore, by combining single components of horizontal particle velocity measured by different geophones the divergence can be calculated. Similar configurations of 1C geophones can be designed to measure curl components and/or to include up/down separation of divergence and curl.

Additionally, the present invention can be implemented as a cluster of sources, rather than as clusters of receivers, according to theorem of reciprocity. In this embodiment the spacing and relative placement of the receivers in FIGS. 3–6 would instead apply to the spacing and placement of the sources. The analytical method described above could then be used to achieve the objects of the invention.

While preferred embodiments of the invention have been described, the descriptions are merely illustrative and are not intended to limit the present invention. For example, although the embodiments have been described in the context of using geophones as the receivers of seismic energy, other types of receivers are contemplated and could be used in the present invention. For example in FIG. 6, receivers 52, 54 and 56 could of the type based on optical and/or laser beams.

What is claimed is:

1. An apparatus for hydrocarbon exploration comprising:
   a seismic source adapted to impart seismic energy into the earth at a predetermined time;
   at least four seismic receivers each adapted to measuring the seismic energy from the seismic source that has been reflected from one or more subterranean earth structures outside the near-site structure, the seismic receivers located substantially in a plane at or near the earth surface, wherein said at least four seismic receivers are spaced less than about 1 meter from each other to form a receiver cluster and wherein three of said at least four seismic receivers define a plane with a fourth seismic receiver being located external to said plane, thereby enclosing a volume with said at least four seismic receivers being located at the corners of said volume.

2. An apparatus according to claim 1 wherein the each of the one-component geophones are positioned in a diamond-shaped pattern and each of the sensed components are in different directions within the plane.

3. An apparatus according to claim 1 wherein each of the receivers are geophones capable of measuring at least three components.

4. An apparatus according to claim 3 wherein the earth surface is the surface of land.

5. An apparatus according to claim 3 wherein the earth surface is the sea bottom.

6. An apparatus according to claim 1 wherein a hydrocarbon reservoir is located near the one or more subterranean earth structures outside the near-site structure.

7. An apparatus according to claim 3, wherein the at least three components of each of the geophones are transmitted to a processing unit to calculate an approximation of the full wavefield at the position of the cluster making use of a free surface boundary condition.

8. A method for hydrocarbon exploration comprising:
   imparting seismic energy into the earth at a predetermined time such that the seismic energy travels through the earth and reflects off of one or more subterranean earth structures outside the near-site structure;
   positioning at least four seismic receivers substantially in a plane at or near the earth surface, wherein the seismic receivers are spaced less than about 1 meter from each other to form a receiver cluster and wherein three of said at least four seismic receivers define a plane with a fourth seismic receiver being located external to said plane, thereby enclosing a volume with said at least four seismic receivers being located at the corners of said volume;
   receiving seismic energy imparted by the seismic source that has been reflected off of the one or more subterranean earth structures;
   storing seismic data that represents the received seismic energy; and
   analyzing the data such that characteristics of one or more hydrocarbon reservoirs can be determined.

9. A method according to claim 8 wherein the step of analyzing comprises the step of measuring the curl and divergence of the wavefield from the seismic data, thereby identifying seismic components within the seismic data.

10. A method according to claim 9, wherein P-wave and S-wave components are separately identified.

11. A method according to claim 10, wherein up-going and down-going wavefield components are identified from the seismic data.

12. A method according to claim 11, wherein the step of analyzing further comprises attenuating unwanted seismic components from seismic data.

13. A method according to claim 12, wherein the step of analyzing further comprises the step of averaging the curl and divergence over the selected plane or volume of acquisition.

14. A method according to claim 13, wherein the step of analyzing further comprises the step of defining the selected plane or volume of acquisition to be small compared to the wavelength of seismic waves to be detected.

* * * * *